Patented Dec. 15, 1936

2,063,972

UNITED STATES PATENT OFFICE 2,063,972

FLUID-CIRCULATING CLEANING COMPOSITION

Elmer Wade Adams and Thomas Hunton Rogers, Hammond, Ind., assignors to Standard Oil Company, Chicago, Ill., a corporation of Indiana No Drawing. Application May 25, 1932, Serial No. 613,590

9 Claims. (Cl. 87—5)

This invention relates to a new composition of matter for use in cleaning fluid-circulating systems such as the radiators of internal combustion engines.

Most internal combustion engines are provided with a means for circulating water around the cylinder block to cool the engine, and a radiator system for maintaining the temperature of the circulating water within some predetermined range of temperatures. The radiator systems are generally provided with a large number of small tubes through which the warm water is circulated, thereby enabling the heat to be quickly dissipated. The water used in radiators contains small quantities of mineral salts such as the calcium, iron, and magnesium salts of mineral and organic acids, and these salts are deposited within the radiator system as a result of evaporation of part of the water. Partly due to the presence of these salt deposits on the metallic parts of the radiator system and partly due to the corrosion products of the metals of which the cooling system is composed, the small passages of the radiator system become obstructed. Since fluid-circulating systems are made up of several metals and metallic compositions such as iron, copper, tin and solder, electrolytic action causes a material increase in the amount of rust and corrosion within the system. Also the dissolved oxygen in the water causes the metals to oxidize and form rust. The rust, precipitated mineral salts and other solid bodies that form in the system insulate the internal surface of the system and materially retard the dissipation of heat therefrom, thereby causing overheating of parts to be cooled. Also the solid particles of rust, mineral salt precipitants and other solid matter soon obstruct the passage of water through the small tubes in the system.

The object of our invention, therefore, is to provide a composition of matter for removing the rust and solid products from fluid-circulating systems without affecting the metallic parts of the system.

We have found that compositions comprising chiefly the acid recovered from petroleum oil sludge, can be effectively used for cleaning the objectionable deposits from automobile radiators, without appreciably attacking the metals and other parts of which they are composed. The sludge acid we employ is prepared by subjecting petroleum oils to a sulfuric acid treatment, removing the acid layer from the oil and diluting the acidic material with water, thereby permitting the tarry substances to separate therefrom, leaving a brownish red liquid which contains sulfuric acid and organic inhibiting agents. This composition is called inhibited acid. For a specific example of preparing this inhibited acid, kerosene or cracked hydrocarbon oils such as cracked gasoline are contacted with about one to six pounds of 75% sulfuric acid per barrel of oil, and the acid layer is then settled out and withdrawn. This acid layer is diluted to a concentration of about 35 to 40% sulfuric acid. A tarry substance separates as a result of this treatment, especially if the liquid is allowed to stand an appreciable time or is heated. The sludge is removed and the acid layer is preferably further diluted to a concentration of about 20 to 30% sulfuric acid and then steamed to improve the odor of the inhibited acid. The resulting inhibited acid is a brownish red liquid. Instead of preparing the acid sludge from cracked hydrocarbon oils or pressure distillates, the sludge prepared from lubricating oils, shale oils and other mineral oils may also be used as a source of inhibited acid.

The cleaning composition is prepared by mixing about one-third to one pint of inhibited 25-30% sulfuric acid with about one-half to two pints of kerosene, or some other light mineral oil. This mixture is then added to an automobile radiator for example, which contains about three gallons of water. The engine is then operated for about 20 to 30 minutes after which time the rust, grease, and other solid obstructions are dissolved or loosened by the cleaning fluid. The radiator is then emptied and flushed with fresh water to remove the traces of acid. A small amount of the cleaning fluid may be left in the radiator permanently.

The inhibited acid prepared from the petroleum products contains a complex mixture of organic bases which prevent the acid from reacting with the metallic surfaces of the radiator, but these organic mixtures do not retard the action of the acid upon the rust and other solid materials in the radiator.

The light mineral oil used with the inhibited acid enhances the effectiveness of the inhibited acid by dissolving the heavy greases and oleaginous substances that accumulate in the radiator system, thereby permitting access of the aqueous inhibited acid to the rust and other obstructions. The greasy material may be removed with a solvent therefor and immediately thereafter, as part of the same operation, remove the oxide scales with a dilute aqueous solution of an inhibited acid. When inhibited acid is used alone, its effectiveness as a rust remover is greatly impaired by the presence of oily and greasy materials. In fact, the effectiveness of the inhibited acid is substantially nil if a grease solvent, such as kerosene or organic solvents, is not used in the combination. These greases and heavy oily materials usually get into the radiator system as a result of leaks in the water pump. Other light mineral oils having a Saybolt viscosity of 40 to 120 at 100° F. and a boiling point above about 212° F. may be used instead of kerosene. Also other water immiscible organic solvents such as xylene, cymene, dekaline, and turpentine may be used instead of kerosene.

As a modification of our invention, we may separate the free organic bases from the acid sludge and incorporate them in another acid solution such as hydrochloric acid, citric acid, acetic acid and the like. These acids, particularly hydrochloric acid, have a more rapid action when cleaning radiators in which hard water has been employed. When the inhibited sulfuric acid is used to clean fluid circulating systems which contain large amounts of precipitated calcium salts, the sulfuric acid reacts with the calcium compounds and form calcium sulfate which is insoluble in water, whereas, when inhibited hydrochloric acid is used, the calcium chloride and other metal halides will dissolve in the water.

The free organic bases are generally prepared by neutralizing the acid layer derived from the sulfuric acid treatment of mineral oils. After neutralization with some alkaline material such as sodium hydroxide, the organic bases separate as an oily layer on the surface of the solution and may be removed therefrom by decantation.

The inhibited acid is prepared from the free bases by dissolving from 0.1 to 1 gram of the organic bases, obtained above, in one liter of 15 to 30% hydrochloric acid. About one-half pint of this inhibited hydrochloric acid solution is added to about one-half to two pints of kerosene and the admixture is then added to an automobile radiator containing about three gallons of water. The engine is then operated about 20 to 30 minutes. The radiator is then emptied and flushed with fresh water to remove the occluded acid.

It should be understood that our composition may be used to clean steam boilers, radiator systems used for heating purposes, and other fluid circulating systems. Pumps or any suitable means may be employed to circulate the cleaning fluid through the system.

The organic bases may be used within a wide range of concentrations, but generally it is not necessary to go above a 2% concentration for each three gallons of water in the fluid-circulating system. Also the amount of kerosene or light oils may be varied from the amounts given in the above two examples, but generally it is not necessary to use more than one quart of oil for each three gallons of water in the fluid-circulating system. The concentration of acid in each three gallons of water may vary from 0.2 to 3.5%, but concentrations of about 0.5% are generally used.

Although the present invention has been described in connection with the details of specific embodiments thereof, it is not intended that these details shall be regarded as limitations upon the scope of the invention except as included in the appended claims.

We claim:

1. The method of removing grease and incrustation deposits from fluid circulating systems without dismantling the same, which comprises circulating a cleaning agent through said system, said cleaning agent comprising the following proportion of ingredients; about three gallons of water, from 0.5 to 2 pints of a light mineral oil and from 1/3 to 1 pint of inhibited 25-30% sulfuric acid.

2. The method of removing grease and incrustation deposits from fluid circulating systems without dismantling the same, which comprises circulating a cleaning agent through said system, said cleaning agent comprising the following proportion of ingredients; about three gallons of water, from 0.5 to 2 pints of a light mineral oil and about one-half pint of 15-30% hydrochloric acid containing from 0.1 to 1 gram of an organic base separated from mineral oils.

3. A cleaning composition for fluid circulating systems, comprising the following proportion of ingredients; about three gallons of water, from 0.5 to 2 pints of light mineral oil, and from one-third to one pint of inhibited 25-30% sulfuric acid.

4. A cleaning composition for fluid circulating systems, comprising the following proportion of ingredients; about three gallons of water, from 0.5 to 2 pints of a light mineral oil having a viscosity from 40 to 120 seconds Saybolt at 100° F., and about one-half pint of 15 to 30% hydrochloric acid containing from 0.1 to 1 gram of an organic base separated from mineral oils.

5. The method of removing grease and incrustation deposits from fluid circulating systems of the type of automobile radiators, which comprises circulating a cleaning agent through said system, said agent comprising the following proportions in ingredients; from 1/3 to 1 pint of inhibited 20-30% sulfuric acid, about 0.5 to 2 pints of kerosene, and about three gallons of water.

6. A cleaning composition for fluid circulating systems, comprising the following proportions of ingredients; about three gallons of water, from 0.5 to 2 pints of a water-immiscible grease solvent, and from 1/3 to 1 pint of inhibited 20-30% sulfuric acid.

7. A cleaning composition for fluid circulating systems, comprising the following proportion of ingredients: for each 3 gallons of water, about 0.5 to 2 pints of a light mineral oil, and about 0.2 to 3.5% of an inhibited mineral acid.

8. A cleaning composition for fluid circulating systems, comprising the following proportions of ingredients: for each 3 gallons of water, about 0.5 to 2 pints of a water-immiscible grease solvent and from 0.2 to 3.5% of an inhibited mineral acid, said acid being selected from the group consisting of sulfuric acid and hydrochloric acid.

9. The method of removing grease and incrustation deposits from fluid circulating systems which comprises circulating a cleaning agent through said system, comprising the following proportion of ingredients: for each 3 gallons of water about 0.5 to 2 pints of a light mineral oil and about 0.2 to 3.5% of an inhibited mineral acid.

ELMER WADE ADAMS.
THOMAS HUNTON ROGERS.